Oct. 10, 1950  R. B. ENSMINGER  2,525,023
PORTABLE SOIL MILL WITH ADJUSTABLE LEGS
Filed June 1, 1948  2 Sheets-Sheet 1

INVENTOR.
RALPH B. ENSMINGER
BY
Bruce & Brosler
HIS ATTORNEYS

Oct. 10, 1950     R. B. ENSMINGER     2,525,023
PORTABLE SOIL MILL WITH ADJUSTABLE LEGS
Filed June 1, 1948     2 Sheets-Sheet 2
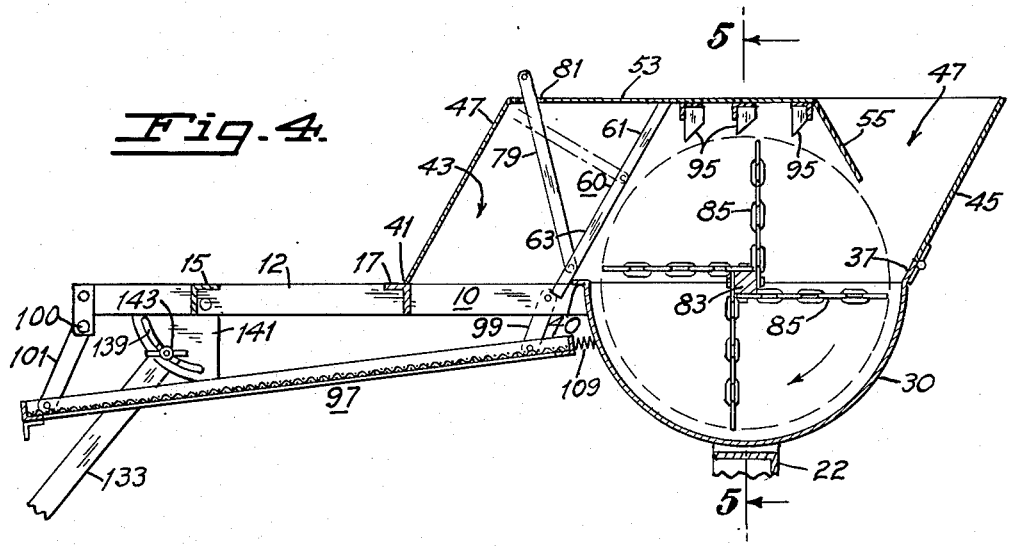
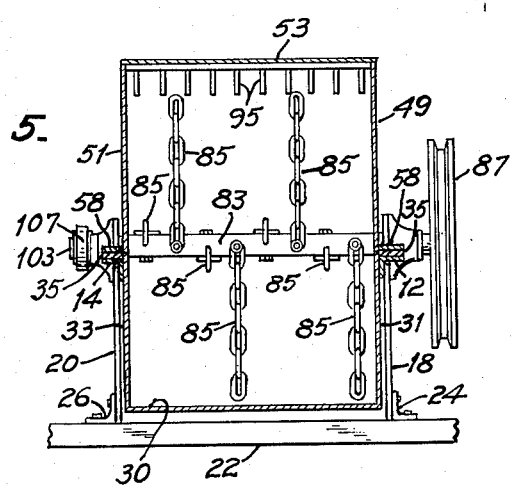
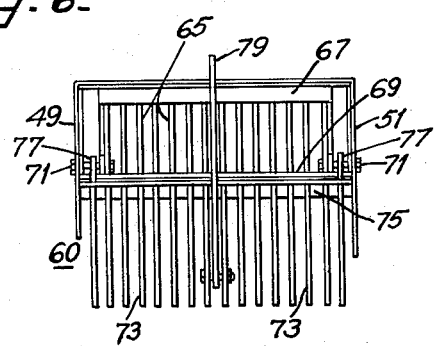
INVENTOR.
RALPH B. ENSMINGER
BY
Bruce & Brosler
HIS ATTORNEYS Patented Oct. 10, 1950

2,525,023

UNITED STATES PATENT OFFICE 2,525,023

PORTABLE SOIL MILL WITH ADJUSTABLE LEGS

Ralph B. Ensminger, Berkeley, Calif.

Application June 1, 1948, Serial No. 30,399

3 Claims. (Cl. 241—101)

This invention relates to soil mills and more particularly to apparatus of this class which may be used for the efficient pulverizing of soil and/or the mixing of the same with other nursery and garden materials such as fertilizer, humus, etc.

In the operation of nurseries and greenhouses, etc. it is necessary to provide throughout the growing season, a supply of finely divided soil which prior to utilization is ordinarily mixed with humus, compost and/or fertilizer for use in starting seedlings, transplanting, etc. The breaking up of the soil whether performed simultaneously with the mixing operation or prior thereto is ordinarily a time-consuming chore when performed manually, and hence is frequently less thorough than is desirable. This is particularly true when the soil includes many hardpacked lumps or clods which resist manual methods of pulverization. While a number of screenings will serve to separate the clods from the divided loam, the former must still be broken up to be useable.

It is therefore an object of the present invention to provide a soil mill which will rapidly and efficiently transform a coarse soil mixture including clods, into soil of relatively homogeneous fineness.

Another object of the invention is to provide a soil mill in which the soil is promptly removed from the apparatus as it is reduced to a requisite degree of fineness.

A further object of the invention is to provide a soil mill so constructed as to transform with maximum efficiency, the kinetic energy of the moving clod-breaking elements to the clods in the path thereof.

Still another object is to provide a soil mill in which the removal of unbreakable foreign matter such as stones or metallic objects is facilitated.

Another object of the invention is to provide, in a portable soil mill, novel means whereby the elevated position of the same may be quickly adjusted as desired.

Another object of the invention is to provide with a soil mill, a vibrating screen that is so disposed in relation to the discharge opening of the former as to more efficiently screen the material received therefrom.

Another object of the invention is to provide a soil mill which may be readily and economically serviced.

Other objects and advantages of the invention will be apparent during the course of the following description.

In the accompanying drawings, forming a part of this specification, and in which like numerals are employed to designate like parts throughout the same:

Figure 4 is a sectional elevational view of the soil mill elements of this invention and their relation to the vibrating screen, and is taken in the plane 4—4 of Figure 2;

Figure 5 is a vertical sectional view taken in the plane 5—5 of Figure 4;

Figure 6 is an elevational view of a grill disposed across the discharge passage of the mill housing;

Figure 8 is a perspective view of a tool for adjusting the height of the soil mill.

Figure 1:
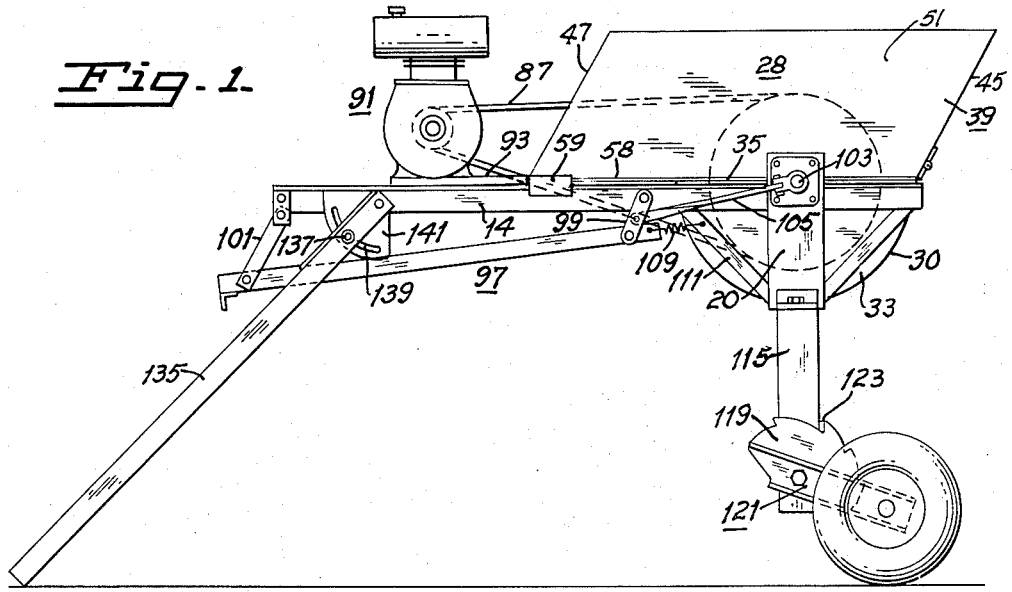
Figure 1 is a side elevational view of the soil mill of this invention.
Figure 2:
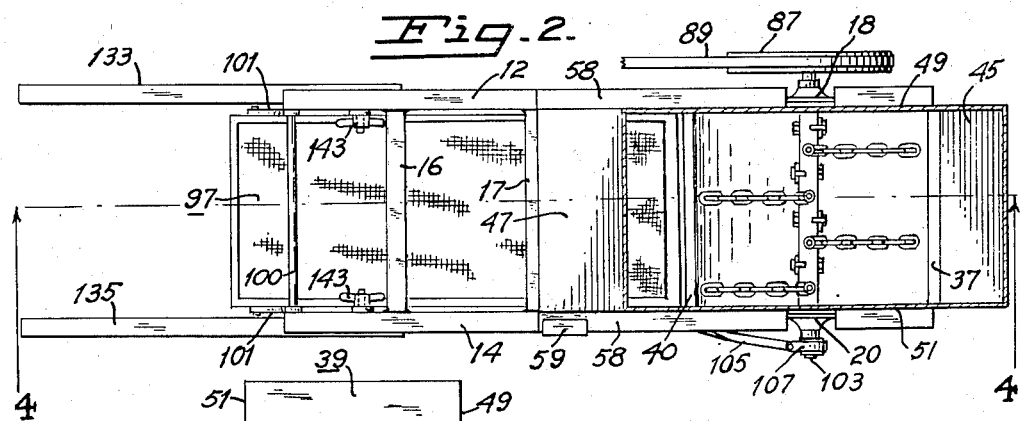
Figure 2, is a plan view of the device of Figure 1, partly broken away to show the interior of the mill housing, and with the power means removed to better show the shaker screen.
Figure 3:
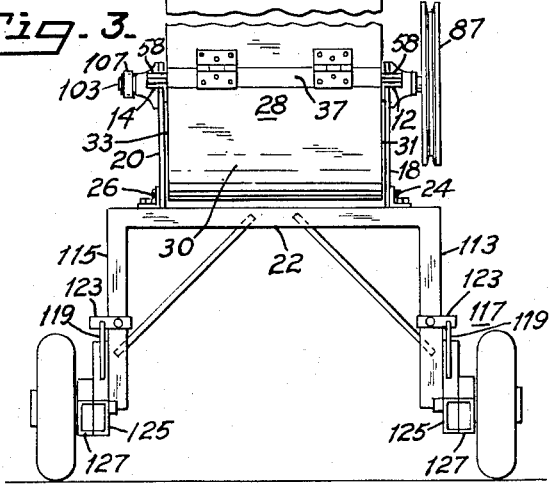
Figure 3 is an end elevational view as viewed from the right in Figure 1.
Figure 7:
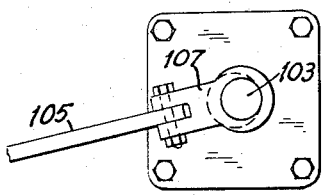
Figure 7 is an enlarged elevational view of the eccentric drive for the shaker screen constituting a component of the present invention.

Referring to the drawings for details of the invention in its preferred form, there is provided a horizontally disposed frame 10 preferably utilizing structural members in the form of angle iron and comprising parallel longitudinal members 12, 14 suitably connected by spaced cross members 16 and 17, at intermediate points on the forward half of the frame and at a short distance inwardly from the other end, the longitudinal members are supported by a pair of vertically disposed plates 18, 20 secured to a bridge member 22 by means of angle plates 24, 26.

Supported by the frame 10 between the vertical plates is a mill housing 28 which preferably includes a lower, trough-like portion 30 with its axis transversely of and in the plane of the frame, and a pair of spaced end walls 31, 33 lying adjacent the vertical plates 18 and 20, and formed with flanges 35 to overlay and rest upon the longitudinal frame members 12 and 14.

The front edge of the trough portion of the housing extends upwardly in an angularly deflected flange 37 to which is hinged the upper portion or cover 39 of the housing. Such cover extends to the rear beyond the rear edge 40 of the trough portion and sufficiently to bring the rear edge 41 to rest upon the cross member 17 when such cover is in its lowered position. This leaves a substantial space between the rear edge of the cover and the rear edge of the trough portion of the housing to define the exit of a discharge passage 43 from the mill housing.

Structurally the cover comprises front and rear end walls 45 and 47 respectively sloping toward the front and interconnected by a pair of side walls 49, 51 and a roof 53. By slitting the front end of the roof along its junction with the vertical walls and angularly deflecting the same downwardly, the deflected portion 55 forms with the surrounding walls, a hopper 57 having a discharge opening connecting with the interior of the housing.

The cover side walls have flanges 58 and these in combination with a pair of clips 59, each pivotally secured to a frame side member adjacent the rear end of the cover and adapted to straddle the side member flange and the proximate side wall flange, serve to lock the cover in its closed condition.

Extending from the roof of the cover down to the edge 40 of the trough portion of the housing and parallelling the front wall thereof, is a grill 60. This grill is made up of an upper section 61 and a lower section 63. The upper section includes a plurality of parallel spaced bars 65 connected across their upper ends by an angularly positioned cross piece 67 for affixing the same to the roof of the cover, while the lower ends of these bars are also connected by a cross member 69. This upper portion of the grill is fixedly anchored in its angular position by a bolt 71 at each lower corner thereof, connecting the same to the adjacent side wall of the cover.

These bolts provide means for hingedly securing the lower portion of the grill to the upper fixed portion, such lower hinged portion comprising a plurality of parallel spaced bars 73 rigidly connected together at their upper ends by a section of angle iron 75 to which ears 77 are affixed for hingedly anchoring or securing the same to the aforementioned bolts.

Raising of this hinged portion of the grill from its lower rest position against the front edge of the trough portion of the housing, is made possible by a handle in the form of a bar 79, bolted at its lower end between the two center bars of the hinged portion of the grill, and extending upwardly through a slit 81 provided in the roof of the cover for the purpose.

Disposed axially of the trough portion of the housing and journalled in bearings mounted on the vertical plates 18 and 20, is a square shaft 83. Spirally arranged along the shaft at regularly spaced points thereon, are a plurality of flexible members, preferably in the form of chains 85 of a length just sufficient to approximately reach the curved surface of the trough portion of the housing.

One end of the shaft carries a pulley 87 adapted to be connected by a belt 89 for example with an engine such as a gasoline engine 91 or other source of power mounted on a platform 93 supported on the cross members 15 and 17 of the horizontal frame.

Rotation of the shaft will cause the chains to assume radial positions and any material dumped into the hopper will be guided into the path of movement of these whirling chains and subjected to the impact therefrom. As the material becomes sufficiently broken up through such impacts, to pass between the bars of the grill, such material will be thrown through the discharge passage leading to the exit between the rear edge of the cover and the rear edge of the trough portion of the housing.

However, material which does not readily break up or pulverize under the impact of the whirling chains, will be driven against a series of hardened metal teeth 95 arranged in a plurality of rows across the roof of the cover, in proximity to the arc defined by the whirling chains.

The material discharged from the housing is preferably screened before use, and for this purpose, a rectangular shaker screen 97 is disposed below the frame and positioned to catch the material as it is discarded from the housing. Such screen is supported from the horizontal frame by rocker links 99 at the front end and by a cross-bar 100 carried by links 101 at the rear end, the links supporting the front end of the screen being somewhat shorter than those at the rear end so that the screen will assume a somewhat inclined position.

The shaker screen is driven from the end of the shaft remote from the pulley, which end is provided with an eccentric 103 for this purpose. A rod 105 having a journalled connection 107 at one end to the eccentric, and at its other end being pivotally connected to an intermediate point on one of the short links 99, will cause the shaker screen to oscillate with rotational movement of the chain shaft. A coil spring 109 resiliently anchoring the rear end of the screen to a brace bar 111 of the bridge member, will serve to stabilize the oscillatory movement of the screen under these conditions.

A feature of the present invention resides in the provisions for adjusting the elevation of the above described apparatus so that it can be made to just clear a wheelbarrow or other receptacles, such as a series of flats on a conveyor belt, should it be desired to sift the product of the mill directly into receptacles instead of permitting it to pile up on the ground. For this purpose, the bridge member which terminates in a pair of rigidly depending legs 113 and 115, has affixed at the lower end of each such leg, means for increasing the effective length thereof.

Each such means comprises a leg extension 117 pivotally secured adjacent one end to the lower end of a leg, and having affixed thereto as by welding, a toothed sector 119 for use in cooperation with a suitable pawl 123 which is pivotally secured to an edge of the leg in position to be dropped into one or the other of the notches defining the teeth of the sector.

The free end of the leg extension, preferably has a wheel mounted thereon to facilitate maneuvering of the soil mill from one position to another which wheels are preferably fitted with tires to enhance maneuverability. To effect an adjustment of the legs for elevation, each leg extension is preferably fabricated from a pair of U-shaped channel sections 125 and 127 welded or otherwise affixed together with their flange edges in contact to form a box channel. The outer channel section 127 however, is preferably of shorter length to facilitate use of a long handle adjusting tool 129 having a pair of laterally extending teeth 131 affixed thereto at one end. By straddling the front upper edge of this shorter section, with the teeth of the tool, a leg extension may be swung on its pivot to any of the elevational positions provided for by the toothed sector. By freeing the pawl from its engagement with the sector, the mill may be gradually lowered by thereafter exercising suitable restraint on the tool.

The leg extensions are preferably designed to extend sufficiently beyond the pivot connection, so as to engage the ground in the lowermost adjustment thereof to relieve the tires of the weight of the mill during non-use periods.

At its rear end, the frame is supported by a pair of legs 133, 135. These are each pivotally secured to one of the frame members to permit angular adjustment thereof for levelling off the frame in accordance with the elevational adjustment of the front legs. Angular adjustment is maintained by a bolt 137 on the leg, extending through an arcuate slot 139 of a plate 141 affixed to the frame member adjacent the leg and carrying a winged nut 143 on the threaded end thereof. By extending the range of the slot to permit the rear legs to assume a substantially horizontal position, such legs may be used as handles in moving the mill around.

From the above description of my invention, its operation becomes more or less apparent. Material to be broken up or pulverized is dumped into the hopper end of the housing, where it is guided into the path of the whirling chains and exposed to the pulverizing impact thereof and the material discharged from the housing drops to the shaker screen and is sifted.

Material which is not broken up sufficiently on the first impact to pass through the grill, is thrown with considerable force against the breaker teeth, thereby facilitating the work of the chains.

What is not so apparent and which has proven to be of considerable advantage in the operation of the mill, is the fact that the whirling chains function as a powerful blower to set up an air stream through the grill which aids very materially in carrying the broken up and pulverized material through the grill to the shaker screen. The combined effect of the chains and air stream is to produce a thorough mixing of ingredients introduced into the housing.

Rocks or pieces of metal against which the chains and breaker teeth would be more or less ineffective, may be cleared from the machine simply by lifting the lower hinged portion of the grill, which permits them to be thrown out by the impacts of the chains and discarded.

The extreme flexibility of the chains permits them to "give" if they should impact a heavy non-fracturable item such as stone or metal, and this ability to absorb shock reduces wear and breakage and thereby is conducive to long useful life of such elements. Replacement of the chains however is economically accomplished and readily effected through lifting of the hinged cover which exposes the entire inner workings of the mill. By so designing the mill that the center of gravity thereof approaches the perpendicular through the wheels, movement of the mill from one location to another is greatly facilitated in that the load to be borne by the operator is thereby reduced to a minimum.

While I have disclosed my invention in its preferred form and in considerable detail, the same is subject to alteration and modification without departing from the underlying principles thereof, and I, accordingly, do not desire to be limited in my protection to such details, except as may be necessitated by the appended claims.

I claim:

1. A mill comprising a housing having a lower trough portion and an upper portion provided with an ingress passage and a discharge passage spaced therefrom, a grill disposed across said discharge passage, a shaft extending through said housing and axially of said trough portion, a plurality of flexible elements spaced along said shaft and adapted to assume radial positions when rotated with said shaft, and a row of clod-breaking teeth extending from said upper portion transversely of said housing and substantially to the arc defined by such flexible elements during rotation.

2. A mill comprising a frame, a mill unit mounted in said frame, and means for selectively supporting said frame and unit at various elevations with respect to ground, said means including a pair of front legs, each having an extension pivotally secured thereto and mounting at its free end, a wheel, a toothed sector affixed to such extension and a pawl secured to said leg and adapted to cooperate with said toothed sector to hold said extension in any of a plurality of adjustable positions, a pair of rear legs, and means for angularly adjusting said rear legs with respect to said frame to level off said frame at the elevation determined by said front legs.

3. A mill comprising a frame, a mill unit mounted in said frame, and means for selectively supporting said frame and unit at various elevations with respect to ground, said means including a pair of front legs, each having an extension pivotally secured thereto and mounting at its free end, a wheel, a toothed sector affixed to such extension and a pawl secured to said leg and adapted to cooperate with said toothed sector to hold said extension in any of a plurality of adjustable positions, a pair of rear legs, each in the form of a bar, and means for angularly adjusting said rear legs with respect to said frame to level off said frame at the elevation determined by said front legs, said rear legs having a range of adjustment permitting said legs to function as handles in moving said mill from one position to another.

RALPH B. ENSMINGER.

REFERENCES CITED

The following references are of record in the file of this patent:

UNITED STATES PATENTS

| Number | Name | Date |
|---|---|---|
| 340,999 | Graves | May 4, 1886 |
| 375,787 | Wilkin | Jan. 3, 1888 |
| 661,969 | Fuhr | Nov. 20, 1900 |
| 891,587 | Barker | June 23, 1908 |
| 1,089,777 | Mattingly | Mar. 10, 1914 |
| 1,208,469 | Bradley | Dec. 12, 1916 |
| 1,297,497 | Rosenthal | Mar. 18, 1919 |
| 1,457,210 | Crane | May 29, 1923 |
| 1,731,956 | Wagner | Oct. 15, 1929 |
| 1,839,532 | Calhoun | Jan. 5, 1932 |
| 1,918,917 | Kopriver | July 18, 1933 |
| 2,092,102 | Wilson | Sept. 7, 1937 |
| 2,353,836 | Lindig | July 18, 1944 |
| 2,357,374 | Ariens | Sept. 5, 1944 |